Patented Feb. 27, 1951

2,543,265

UNITED STATES PATENT OFFICE 2,543,265

AMINOACETOBIPHENYL COMPOUNDS

Louis L. Bambas, Grosse Pointe Woods, Mich., assignor to Parke, Davis & Company, Detroit, Mich., a corporation of Michigan No Drawing. Application January 4, 1950, Serial No. 136,831

11 Claims. (Cl. 260—570.5)

This application is a continuation-in-part of my copending application Serial No. 83,778, filed March 26, 1949, now U. S. Patent 2,516,098, and the invention relates to acid addition salts of certain ketonic amines and to methods for obtaining the same. More particularly, the invention relates to acid addition salts of biphenyl aminomethyl ketones having the formula,

where $n$ is 1 or 2, R is the same or different and represents hydrogen, halogen, nitro, lower alkyl or lower alkoxy radicals and HY represents one equivalent of a strong mineral acid such as hydrochloric, hydrobromic, hydroiodic, sulfuric, phosphoric and the like acids.

In accordance with the invention, acid addition salts of biphenyl aminomethyl ketones having the above formula are obtained by hydrolyzing a biphenylyl halomethyl ketone-hexamethylenetetramine complex of formula,

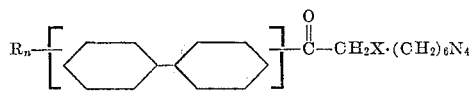

wherein R and $n$ have the same significance as given above and X is a halogen atom. This hydrolysis may be carried out in aqueous or nonaqueous reaction mixtures using an inorganic mineral acid as the hydrolytic agent. Any mineral acid can be used, for example, hydrochloric, hydrobromic, hydroiodic, sulfuric or phosphoric acids can be employed. Regardless of the acid selected as the hydrolysis catalyst, the biphenylyl aminomethyl ketone acid addition salt formed consists principally of the salt corresponding to the acid used in the hydrolysis. For the best yields of the desired products it is preferable to use an alcoholic reaction medium. The function of the alcohol present in such reaction media is to remove the formaldehyde formed in the reaction as the acetal and thus prevent its reaction with either the starting material or final product. Reaction mixtures consisting of or containing alcohols such as methanol, ethanol, n-propanol, isopropanol, n-butanol and the like produce particularly good results.

The hydrolysis reaction can be carried out at temperatures varying from about 0 to 110° C. However, I prefer to use a temperature of about 20 to 30° C. since in this temperature range the reaction proceeds at a reasonable rate and the danger of decomposition of the starting material and/or the final product is almost at a minimum.

The products of the invention are useful as intermediates in the preparation of other organic compounds. They are of particular value in the preparation of organic compounds possessing antibiotic activity against microorganisms of the Rickettsia type.

The invention is illustrated by the following examples.

Example 1

175 g. of the 4-biphenylyl bromomethyl ketone-hexamethylenetetramine complex is added to 200 cc. of concentrated hydrochloric acid in 1 liter of absolute alcohol and the mixture stirred overnight. The insoluble hydrochloride salt of 4-biphenylyl aminomethyl ketone is collected by filtration, washed with a small amount of cold water and dried at room temperature. The formula of this product is,

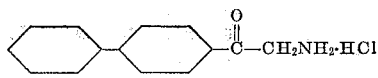

Example 2

175 g. of 3-biphenylyl bromomethyl ketone-hexamethylenetetramine complex is mixed with a cold solution of 1 liter of absolute alcohol and 200 cc. of concentrated hydrochloric acid and the mixture stirred overnight at room temperature. The solid product which consists of the hydrochloride salt of 3-biphenylyl aminomethyl ketone is collected, washed with 200 cc. of ice cold water to remove the ammonium chloride and dried. The formula of this compound is,

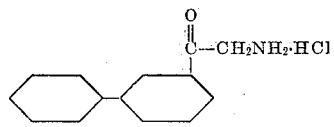

Example 3

100 g. of 4'-methoxy-4-biphenylyl bromomethyl ketone-hexamethylenetetramine complex is mixed with a cold solution of 500 cc. of absolute ethanol and 100 cc. of concentrated hydrochloric acid and the mixture stirred overnight at room temperature. The solid product which consists of the hydrochloride salt of 4'-methoxy-4-biphenylyl aminomethyl ketone contaminated with ammonium chloride is collected, washed with cold water to remove the ammonium chloride and dried. The formula of this product is,

Example 4

100 g. of 4'-nitro-4-biphenylyl bromomethyl ketone - hexamethylenetetramine complex is mixed with a cold solution of 500 cc. of absolute alcohol and 100 cc. of concentrated hydrochloric acid and the mixture stirred overnight at room temperature. The solid product which consists of the hydrochloride salt of 4'-nitro-4-biphenylyl aminomethyl ketone contaminated with ammonium chloride is collected, washed with ice water to remove the ammonium chloride and dried. The formula of this hydrochloride salt is,

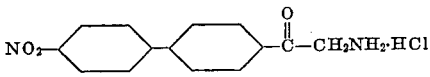

*Example 5*

135 g. of 4'-iodo-4-biphenylyl bromomethyl ketone - hexamethylenetetramine complex is mixed with a cold solution of 1 liter of absolute alcohol and 200 cc. of concentrated hydrochloric acid and the mixture stirred overnight at room temperature. The solid hydrochloride salt of 4'-iodo-4-biphenylyl aminomethyl ketone which separates is collected, washed with cold water to remove the ammonium chloride and dried. The formula of this product is,

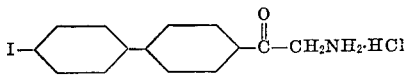

*Example 6*

175 g. of 2'-methyl-4-biphenylyl bromomethyl ketone - hexamethylenetetramine complex is added to 1 liter of methanol and 200 cc. of 12 N sulfuric acid and the resulting mixture stirred overnight at room temperature. The insoluble 2'-methyl-4-biphenylyl aminomethyl ketone sulfate is collected, washed with a small amount of water and dried in vacuo. The formula of this product is,

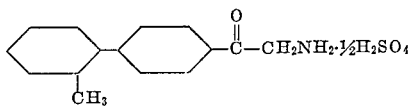

*Example 7*

A mixture consisting of 200 g. of 4'-nitro-6-methyl-3-biphenylyl bromomethyl ketone-hexamethylenetetramine complex, 200 cc. of concentrated hydrochloric acid and 1 liter of isopropanol is stirred overnight at room temperature. The insoluble product is collected, washed with cold water to remove the ammonium chloride and dried. This product is the hydrochloride salt of 4'-nitro-6-methyl-3-biphenylyl aminomethyl ketone of formula,

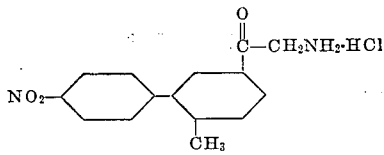

*Example 8*

85 g. of 2-biphenylyl bromomethyl ketone-hexamethylenetetramine complex is added to 100 cc. of constant boiling hydrobromic acid in 750 cc. of absolute alcohol and the mixture stirred overnight. The insoluble hydrobromide salt of 2-biphenylyl aminomethyl ketone is collected by filtration, washed with a small amount of cold water and dried at room temperature. The formula of this product is,

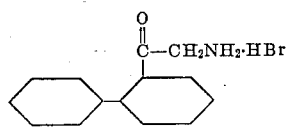

The biphenyl halomethyl ketone-hexamethylenetetramine complexes used as starting materials in the practice of the invention may be prepared by reacting a biphenylyl halomethyl ketone with hexamethylenetetramine in an inert organic solvent. For example, the 4-biphenylyl bromomethyl ketone-hexamethylenetetramine complex used as the starting material in Example 1 is prepared as follows:

75 g. of hexamethylenetetramine dissolved in chloroform is added to 4-biphenylyl bromomethyl ketone and the mixture allowed to stand at room temperature for about three hours. The 4-biphenylyl bromomethyl ketone-hexamethylenetetramine complex is collected, washed with a little chloroform and dried. The formula of this product is,

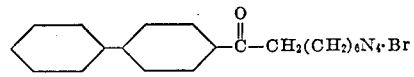

What I claim is:

1. A mineral acid addition salt of a compound of the formula,

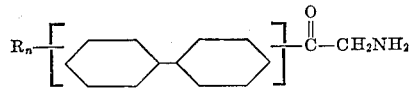

where $n$ is one of the integers 1 and 2 and R is a member of the class consisting of hydrogen, halogen, —NO$_2$, lower alkyl and lower alkoxy radicals.

2. A mineral acid addition salt of a compound of the formula,

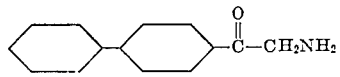

3. 4-biphenylyl aminomethyl ketone hydrochloride.

4. A mineral acid addition salt of a compound of the formula,

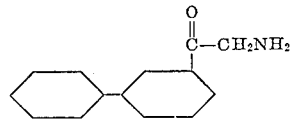

5. 3 - biphenylyl aminomethyl ketone hydrochloride.

6. A mineral acid addition salt of a compound of the formula,

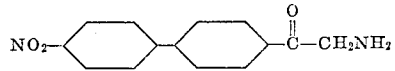

7. 4'-nitro-4-biphenylyl aminomethyl ketone hydrochloride.

8. A mineral acid addition salt of a compound of the formula,

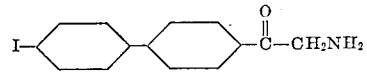

9. 4'-iodo-4-biphenylyl aminomethyl ketone hydrochloride.

10. A mineral acid addition salt of a compound of the formula,

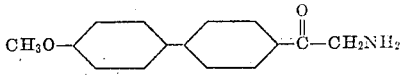

11. 4'-methoxy-4-biphenylyl aminomethyl ketone hydrochloride.

LOUIS L. BAMBAS.

REFERENCES CITED

The following references are of record in the file of this patent:

Chemical Abstracts, vol. 7 (1913), p. 1713.
Chemical Abstracts, vol. 32 (1938), page 5825.